(12) United States Patent
Zhang (10) Patent No.: US 11,353,720 B2
(45) Date of Patent: Jun. 7, 2022

(54) GLASSES WITH REPLACEABLE LENSES

(71) Applicant: Xianzhong Zhang, Wenzhou (CN)

(72) Inventor: Xianzhong Zhang, Wenzhou (CN)

( * ) Notice: Subject to any disclaimer, the term of this patent is extended or adjusted under 35 U.S.C. 154(b) by 283 days.

(21) Appl. No.: 16/458,301

(22) Filed: Jul. 1, 2019

(65) Prior Publication Data

US 2021/0003860 A1 Jan. 7, 2021

(51) Int. Cl.
*G02C 1/00* (2006.01)
*G02C 1/06* (2006.01)

(52) U.S. Cl.
CPC ............... *G02C 1/10* (2013.01); *G02C 1/06* (2013.01); *G02C 2200/08* (2013.01)

(58) Field of Classification Search
CPC ... G02C 1/06; G02C 1/00; G02C 1/10; G02C 5/06; G02C 2200/08
USPC .......... 351/106, 103, 90, 92, 86, 83
See application file for complete search history.

(56) References Cited

U.S. PATENT DOCUMENTS 7,922,320 B1 * 4/2011 Tsai ................. G02C 1/06
351/86

* cited by examiner

*Primary Examiner* — Thomas K Pham (57) ABSTRACT

The utility model discloses glasses with replaceable lenses, and the technical scheme of the glasses comprises a glasses frame, glasses legs connected to two sides of the glasses frame, and a lens assembly detachably fit with the glasses frame, the lens assembly comprising a frame and a lens; the frame is provided with an insertion end; the glasses frame is provided with an insertion groove in inserting fit with the insertion end; a clamping groove adapted to the clamping piece is arranged on the side wall of the insertion groove is provided with a clamping piece; the side wall, opposite to the clamping piece, of the insertion end; the clamping piece is in elastic clamping fit with the clamping groove, and the utility model is simple in structure and easy to detach.

2 Claims, 9 Drawing Sheets

GLASSES WITH REPLACEABLE LENSES

TECHNICAL FIELD

The present utility model relates to glasses, and more particularly, to glasses with replaceable lenses.

BACKGROUND ART

With the improvement of living standard, more and more people begin to pay attention to eye protection, such as wearing sunglasses in summer; in addition, with the increase of learning pressure, the myopia in China is also greatly increased, the age of people with myopia is younger and younger, and these factors directly lead to a large increase in the demand for glasses. Although the glasses frame has a great quality improvement, which greatly extends the useful life of the glasses, it is still common to encounter accidental crush or breakage of the lenses for young people who are active and often performing athletic activities. This often requires the use of appropriately sized screwdrivers or other tools when changing the lenses, which is cumbersome and time-consuming for most glasses wearers.

SUMMARY OF THE UTILITY MODEL

Aiming at the defects of the prior art, the utility model is directed to provide glasses with replaceable lenses, and the glasses have the effects of being simple in structure and easy to detach.

In order to achieve the above purpose, the utility model provides the following technical scheme: glasses with replaceable lenses, comprising a glasses frame, glasses legs connected to two sides of the glasses frame, and a lens assembly detachably fit with the glasses frame, the lens assembly comprising a frame and a lens; it is characterized in that the frame is provided with an insertion end; and the glasses frame is provided with an insertion groove in elastic clamping fit with the insertion end.

The utility model is further provided that the insertion end is provided with a clamping piece; and a clamping groove in elastic clamping fit with the clamping piece is arranged on the side wall, opposite to the clamping piece, of the insertion groove.

The utility model is further provided that the clamping piece comprises a housing and a spring positioning bead limited by the housing; a spring is arranged between the housing and the spring positioning bead; the housing is of a cylindrical structure, and one end face of the cylindrical structure is provided with a circular groove downwards; the spring is arranged in the circular groove; a base is arranged between the bottom of the circular groove and the spring; a conical hole is formed in one surface, opposite to the spring, of the base; one end of the spring is arranged in the conical hole; and a limiting ring with a diameter smaller than that of the circular groove is arranged at the opening of the circular groove.

The utility model is further provided that a convex ring with a diameter larger than that of the limiting ring and smaller than that of the groove is formed at the bottom of the spring positioning bead abutting against the spring; the upper surface of the convex ring abuts against the lower end surface of the limiting ring; the diameter of the spring positioning bead above the convex ring is smaller than that of the limiting ring; and the upper end of the spring positioning bead is provided with a spherical surface.

The utility model is further provided that the spherical surface of the spring positioning ball is adapted to the clamping groove.

In summary, the utility model has the following beneficial effects: in the actual use process, when it is used for the first time, the convex structure is arranged in the corresponding groove to realize the buckling connection at the first point position, then the whole lens assembly is embedded in the glasses frame until the limiting part abuts against the back of the glasses frame, the insertion end is inserted into the insertion groove in the process above; in the insertion process, the spring positioning bead on the clamping piece is firstly pressed towards the inside of the housing by the side wall of the insertion end, then the insertion end continues to be fit with the insertion groove, the clamping groove moves to a position corresponding to the spherical surface of the spring positioning bead, and the spring positioning bead extends into the clamping groove under the action of the spring, so as to realize elastic clamping fit; when fixing connection at the second point position is realized, the lens assembly can be firmly fixed at the glasses frame, the fixing connection at the second point position can be firmer and is not easy to detach due to the arrangement of the clamping piece and the clamping groove; when the lens is accidentally damaged, the insertion end can be directly detached from the glasses frame, the whole lens assembly can be detached, and the use is convenient. In addition, compared with the common mode that the elastic rubber ring is sleeved on the insertion end so as to be in interference fit with the insertion groove, the clamping piece and the clamping groove are more convenient for disassembly, and the application range is wider. For example, at low temperatures, the resilient rubber ring may lose its elasticity, and the clamping piece does not cause this problem.

Reference numerals: 1—glasses frame; 11—groove; 12—insertion groove; 2—lens assembly; 21—lens; 22—frame; 221—frame body; 222—limiting part; 23—convex structure; 24—insertion end; 3—nose bridge; 31—sub-bridge; 32—sub-bridge; 4—glasses leg; 5—clamping piece; 51—housing; 511—circular groove; 512—limiting ring;

52—spring positioning bead; 521—convex ring; 522—spherical surface; 53—spring; 54—base; 541—conical hole; 6—clamping groove.

DETAILED DESCRIPTION

Hereinafter, specific embodiments of the present utility model will be described in further detail with reference to the accompanying drawings and embodiments. The following embodiments serve to illustrate the utility model, but are not intended to limit the scope of the utility model.

Figure 1:
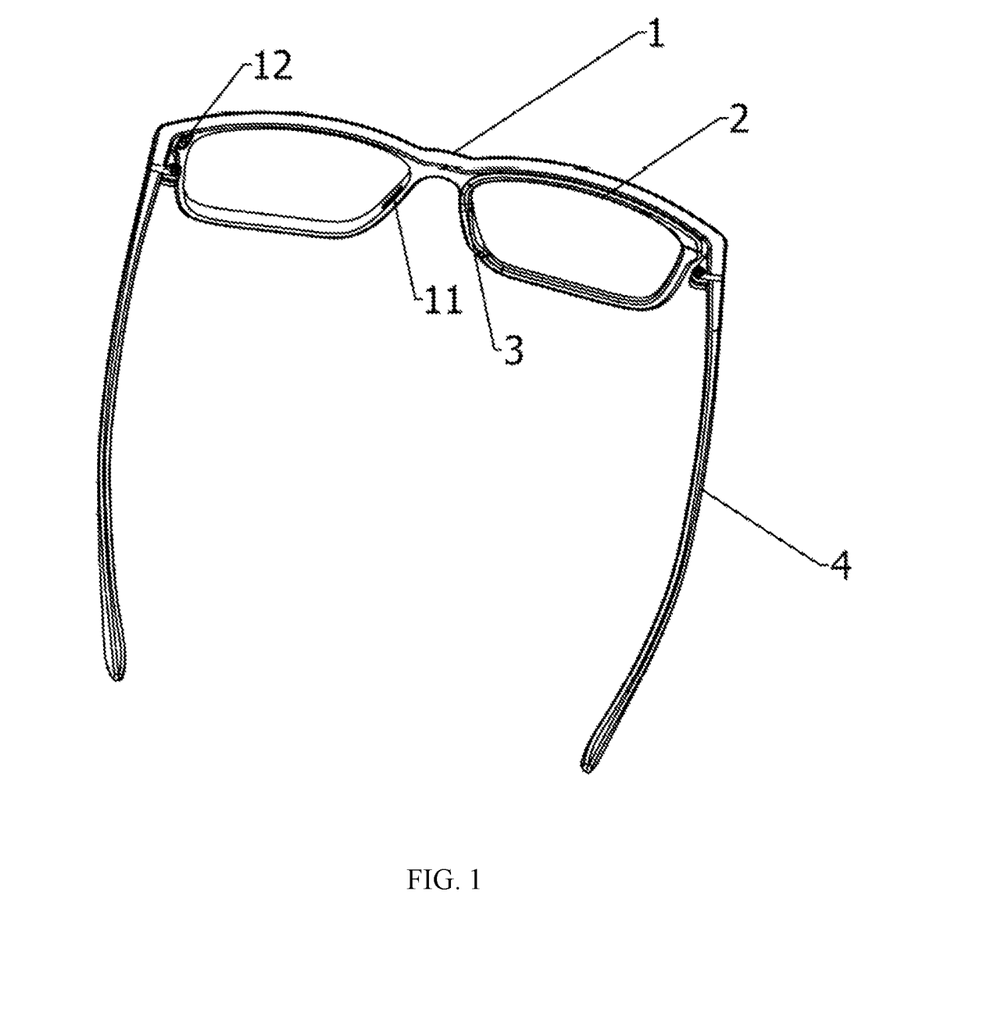
FIG. 1 is a structurally schematic view of the glasses of the embodiment (with the left lens assembly removed and the right lens assembly installed)
Figure 2:
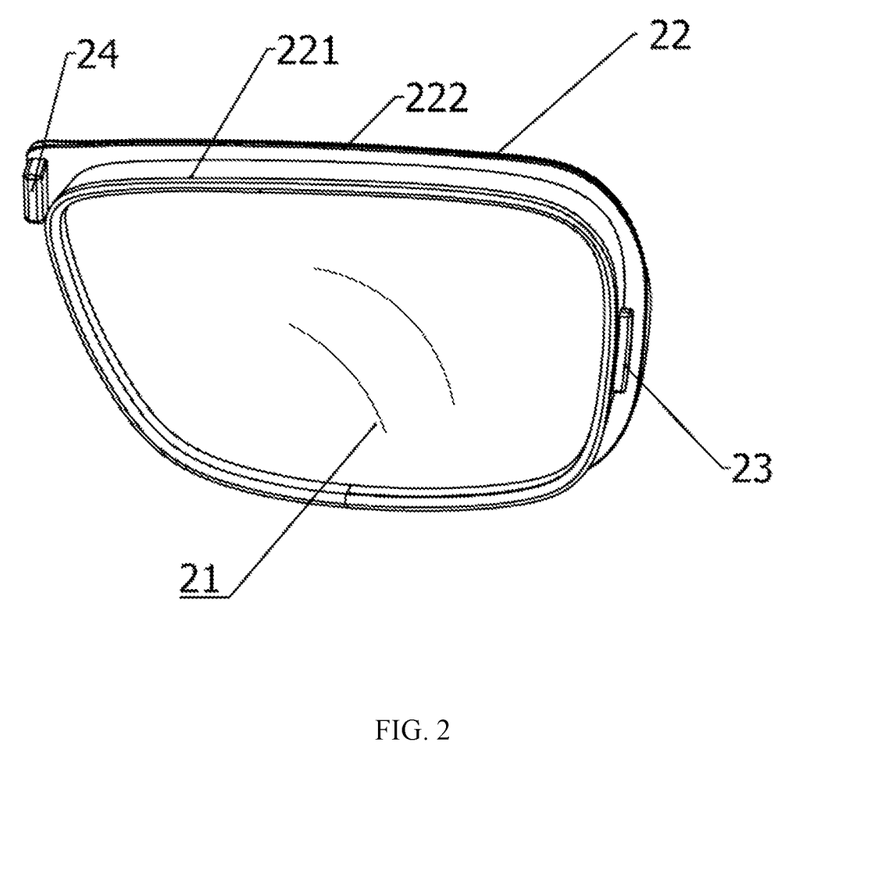
FIG. 2 is a structurally schematic view of the lens assembly of the embodiment.
Figure 3:
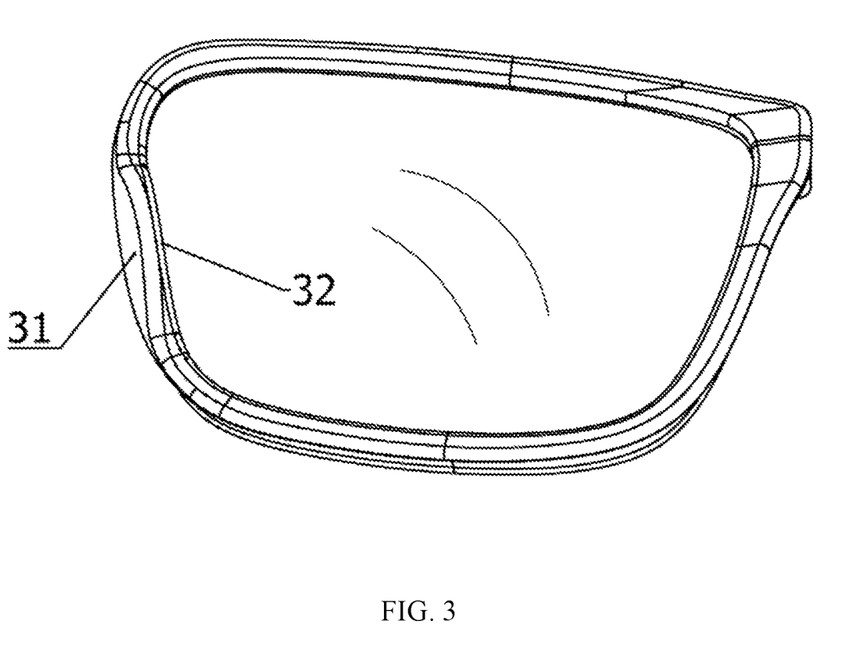
FIG. 3 is a structurally schematic view of the nose bridge of the embodiment.
Figure 4:
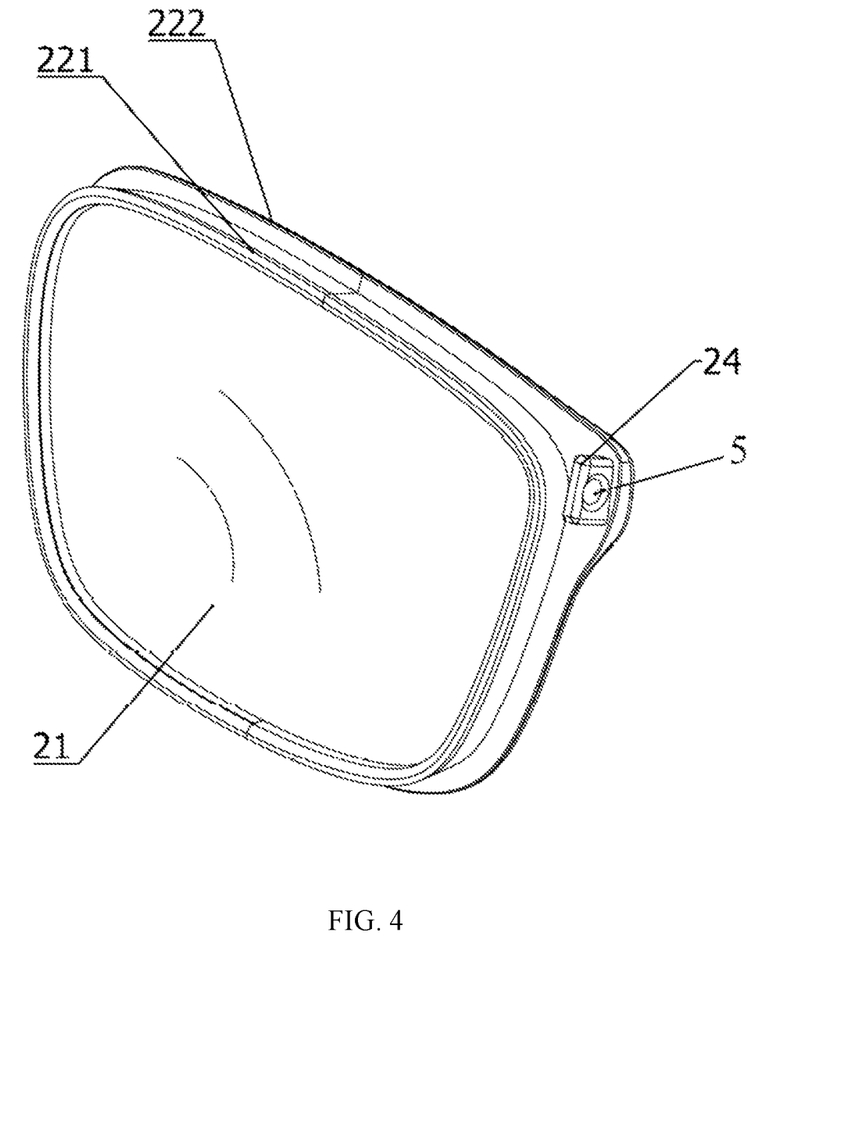
FIG. 4 is a structurally schematic view of the insertion end of the embodiment.
Figure 5:
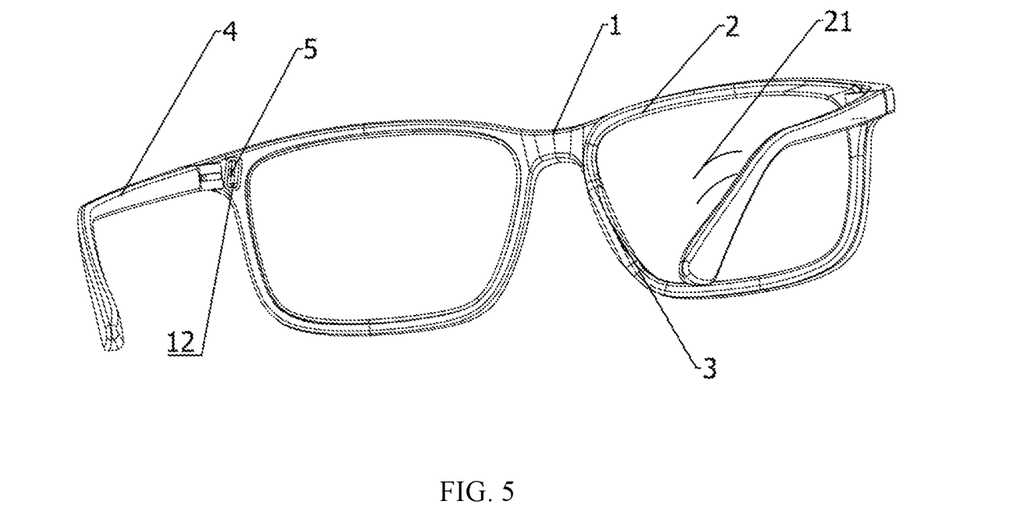
FIG. 5 is a structurally schematic view of the glasses of the embodiment.
Figure 6:
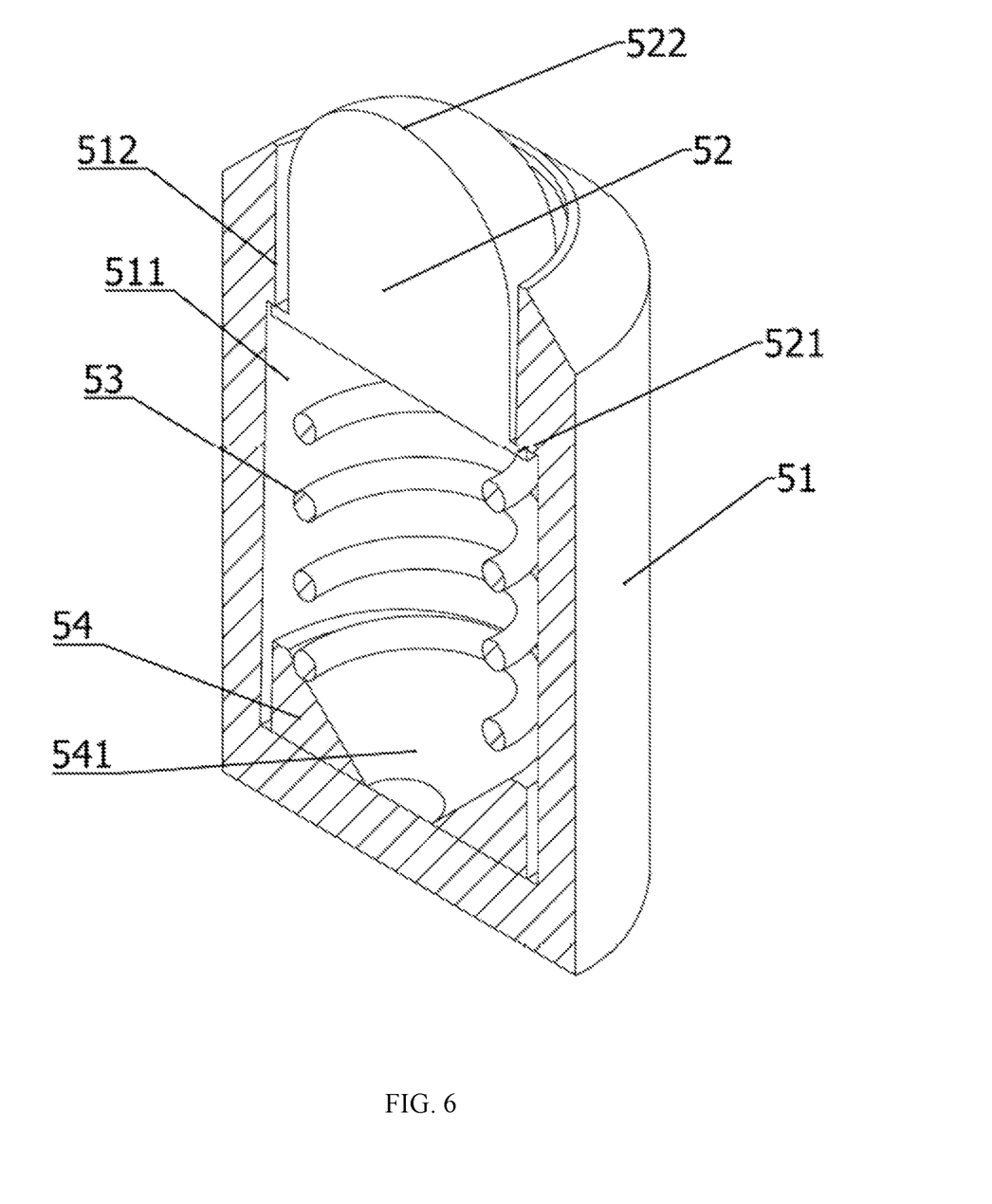
FIG. 6 is a sectional view of the clamping piece of the embodiment.
Figure 7:
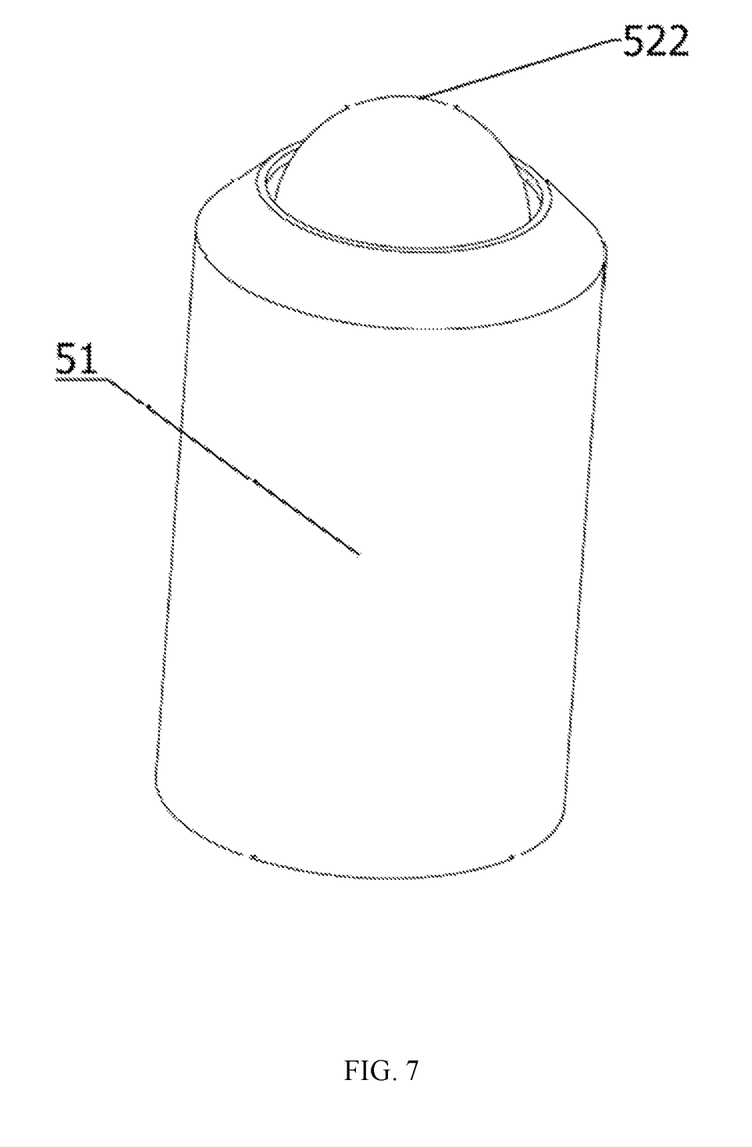
FIG. 7 is a structurally schematic view of the clamping piece of the embodiment.

The embodiment discloses glasses with replaceable lenses, as seen in FIGS. 1-3, including a glasses frame 1, glasses legs 4 connected to two sides of the glasses frame 1, and a lens assembly 2 detachably fit with the glasses frame 1, wherein the lens assembly 2 includes a frame 22 adapted to the shape and size of the inner ring of the glasses frame 1 and being detachable relative to the inner ring of the glasses frame 1, and a lens 21 fixed at the inner side of the frame 22. The glasses frame 1 and the frame 22 are made from PA12 materials, the edge of the outer side of the frame 22 is provided with a convex structure 23, the inner side of the glasses frame 1 is correspondingly provided with a groove 11 in clamping fit with the convex structure 23, the frame 22 is further provided with an insertion end 24, and the glasses frame 1 is provided with an insertion groove 12 in inserting fit with the insertion end 24 after the convex structure 23 is clamped in the groove 11.

As shown in FIGS. 4-7, the side wall of the insertion groove 12 is integrally provided with a clamping piece 5; a clamping groove 6 adapted to the clamping piece 5 is arranged on the side wall, opposite to the clamping piece 5, of the insertion end 24; the clamping piece 5 is in elastic clamping fit with the clamping groove 6; the clamping piece 5 includes a housing 51 and a spring positioning bead 52 limited by the housing 51; a spring 53 is arranged between the housing 51 and the spring positioning bead 52, the housing 51 is of a cylindrical structure, and one end face of the cylindrical structure is provided with a circular groove 511 downwards; the spring 53 is arranged in the circular groove 511; a base 54 is arranged between the bottom of the circular groove 511 and the spring 53; a conical hole 541 is formed in one surface, opposite to the spring 53, of the base 54; one end of the spring 53 is arranged in the conical hole 541; a limiting ring 512 with a diameter smaller than that of the circular groove 511 is arranged at the opening of the circular groove 511; a convex ring 521 with a diameter larger than that of the limiting ring 512 and smaller than that of the groove 11 is formed at the bottom of the spring positioning bead 52 abutting against the spring 53; the upper surface of the convex ring 521 abuts against the lower end surface of the limiting ring 512 so as to limit the spring positioning bead 52 by the housing 51; the diameter of the spring positioning bead 52 above the convex ring 521 is smaller than that of the limiting ring 512; the upper end of the spring positioning ball 52 is provided with a spherical surface 522, and the spherical surface 522 is adapted to the clamping groove 6.

Figure 8:
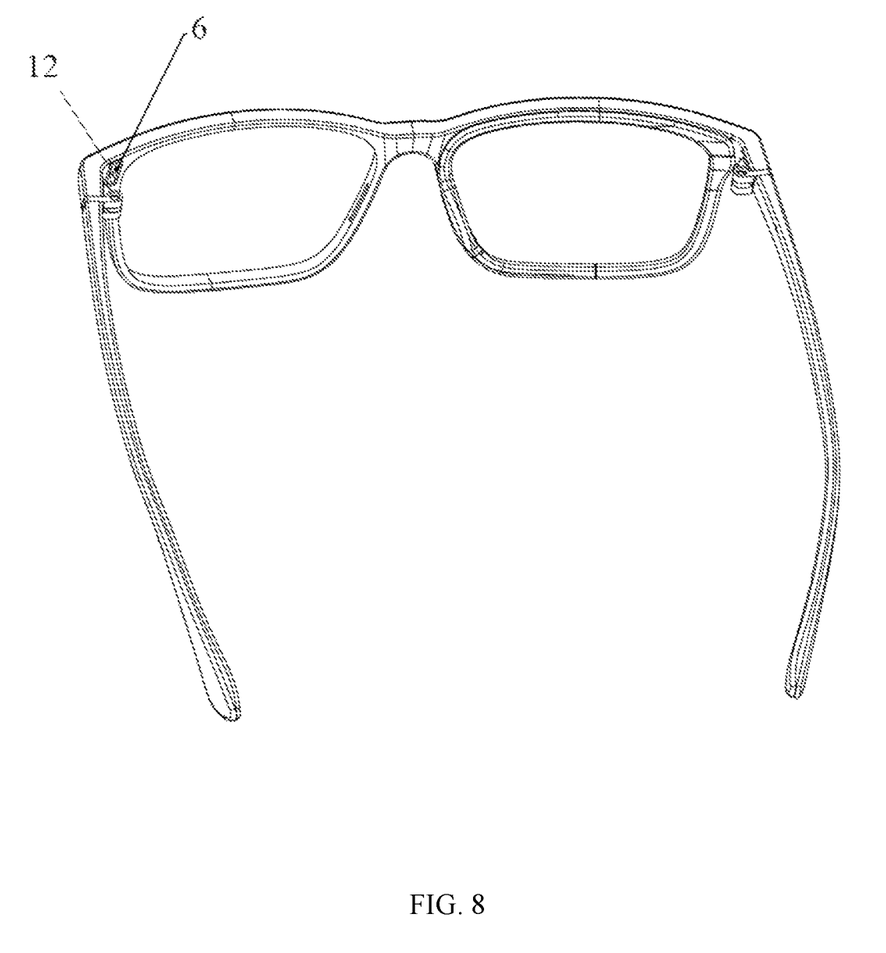
FIG. 8 is a structurally schematic view in the case where the clamping groove is located in the insertion groove in the embodiment.
Figure 9:
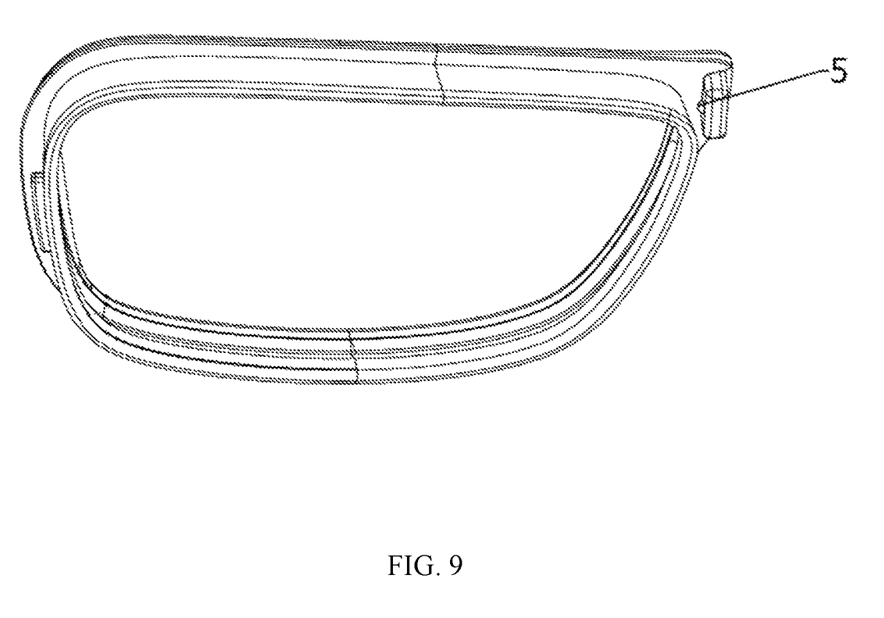
FIG. 9 is a structurally schematic view in the case where the clamping piece is located on the insertion end in the embodiment.

In the embodiment, as shown in FIGS. 8 and 9, the clamping piece 5 can be integrally arranged on the insertion end 24, and the clamping groove 6 is arranged on the side wall of the insertion groove 12 corresponding to the clamping piece 5; the detachable fit of the lens assembly 2 and the glasses frame 1 is realized by the elastic clamping fit of the spring positioning bead 52 on the clamping piece 5 with the clamping groove 6.

As shown in FIG. 2, the frame 22 includes a frame body 221 adapted to the glasses frame 1 and a limiting part 222 extending in the outer direction with respect to the frame body 221, wherein the frame body 221 and the limiting part 222 form a cross-section formed frame 22, the limiting part 222 abuts against the back surface of the glasses frame 1 when the frame 22 is adapted to the inner ring of the glasses frame 1, and the insertion groove 12 is arranged on the back surface of the outer side of the glasses frame 1. The groove 11 is arranged at a position corresponding to the inner side of the glasses frame 1, i.e. the insertion groove 12 is arranged away from the groove 11 in the glasses frame 1 as far as possible.

In the embodiment, it further includes a nose bridge 3 arranged on the limiting part 222, wherein the nose bridge 3 includes a pair of opposite and spaced sub-bridges 32 and 31, the spacing between the pair of sub-bridges 32 and 31 is sequentially reduced from bottom to top, and the two corresponding upper ends are abutted with each other, so that the nose bridge 3 structurally arranged has certain elasticity and is more comfortable to wear. It further includes glasses legs 4 arranged on the two sides of the glasses frame 1, wherein energy stones (omitted in the drawings) are arranged at the ends of the glasses legs 4, and the energy stones can have an anti-radiation effect on mobile phones and various electrical products when people focus on reading work for a long time without resting.

The utility model has the following beneficial effects that in the actual use process, when the utility model is used for the first time, the convex structure 23 is arranged in the corresponding groove 11 to realize buckling connection at the first point position, then the whole lens assembly 2 is embedded in the glasses frame 1 until the limiting part 222 abuts against the back of the glasses frame 1, the insertion end 24 is inserted into the insertion groove 12 in the process above; in the insertion process, the spring positioning bead 52 on the clamping piece 5 is firstly pressed towards the inside of the housing 51 by the side wall of the insertion end 24, then the insertion end 24 continues to be fit with the insertion groove 12, the clamping groove 6 moves to a position corresponding to the spherical surface 522 of the spring positioning bead 52, and the spring positioning bead 52 extends towards the inside of the clamping groove 6 under the action of the spring 53, so as to realize elastic clamping fit; when fixing connection at the second point position is realized, the lens assembly 2 can be firmly fixed at the glasses frame 1, the fixing connection of the second point position can be firmer and is not easy to detach due to the arrangement of the clamping piece 5 and the clamping groove 6; when the lens 21 is accidentally damaged, the insertion end 24 can be directly detached from the glasses frame 1, the whole lens assembly 2 can be detached, and the use is convenient. In addition, compared with the common mode that the elastic rubber ring is sleeved on the insertion end 24 so as to be in interference fit with the insertion groove 12, the clamping piece 5 and the clamping groove 6 are more convenient for disassembly, and the application range is wider. For example, at low temperatures, the resilient rubber ring may lose its elasticity, and the clamping piece 5 does not cause this problem.

The above description is only a preferred embodiment of the present utility model, and is not intended to limit the present utility model, and any amendments, equivalent substitutions, improvements and the like made within the design concept of the present utility model are intended to be included within the scope of protection of the present utility model.

The invention claimed is:
1. Glasses with replaceable lenses, comprising a glasses frame (1), glasses legs (4) connected to two sides of the glasses frame (1), and a lens assembly (2) detachably fit with the glasses frame (1), the lens assembly (2) comprising a frame (22) and a lens (21); wherein an insertion end (24) is arranged on the frame (22); the glasses frame (1) is provided with an insertion groove (12) configured to receive the insertion end (24), the insertion end (24) is provided with a clamping piece (5); a clamping groove (6) corresponding to the clamping piece (5) is arranged on a side wall of the insertion groove (12), wherein the lamping piece (5) partially detachably received in the lamping groove (6); the clamping piece (5) comprises a housing (51) and a spring positioning bead (52) limited by the housing (51); a spring (53) is arranged between a bottom of the housing (51) and the spring positioning bead (52); the housing (51) is of a cylindrical structure, and the cylindrical structure is provided with a circular groove (511) downwards; the spring (53) is arranged in the circular groove (511); a base (54) is arranged at a bottom of the circular groove (511); a conical hole (541) is formed in one side of the base (54); one end of the spring (53) is arranged in the conical hole (541); a limiting ring (512) with a diameter smaller than that of the circular groove (511) is arranged at an opening of the circular groove (511), a convex ring (521) with a diameter larger than that of the limiting ring (512) and smaller than that of the groove (11) is formed at the bottom of the spring positioning bead (52) abutting against the spring (53); the upper surface of the convex ring (521) abuts against the lower end surface of the limiting ring (512); the diameter of the spring positioning bead (52) above the convex ring (521) is smaller than that of the limiting ring (512); the upper end of the spring positioning bead (52) is provided with a spherical surface (522).

2. The glasses with replaceable lenses according to claim 1, wherein the spherical surface (522) of the spring positioning bead (52) is adapted to the clamping groove (6).

* * * * *